United States Patent
Leesberg (10) Patent No.: US 7,665,603 B2
(45) Date of Patent: Feb. 23, 2010

(54) STORAGE CONTAINER WITH LOCKING DEVICE FOR RECORDED MEDIA

(75) Inventor: Vincent C. M. Leesberg, Erp (NL)

(73) Assignee: Autronic Plastics, Inc., Westbury, NY (US)

(*) Notice: Subject to any disclaimer, the term of this patent is extended or adjusted under 35 U.S.C. 154(b) by 88 days.

(21) Appl. No.: 10/549,954

(22) PCT Filed: Dec. 10, 2004

(86) PCT No.: PCT/US2004/041470

§ 371 (c)(1),
(2), (4) Date: Dec. 14, 2006

(87) PCT Pub. No.: WO2005/059919

PCT Pub. Date: Jun. 30, 2005

(65) Prior Publication Data

US 2007/0090003 A1   Apr. 26, 2007

Related U.S. Application Data

(60) Provisional application No. 60/528,355, filed on Dec. 10, 2003.

(51) Int. Cl.
*B65D 85/57* (2006.01)
(52) U.S. Cl. .................. 206/308.2; 206/1.5
(58) Field of Classification Search .......... 206/308.1, 206/308.2, 310, 1.5
See application file for complete search history.

(56) References Cited

U.S. PATENT DOCUMENTS

| 3,862,555 A | 1/1975 | Wirth |
| 3,927,765 A | 12/1975 | Beal |
| 4,425,999 A | 1/1984 | MacDonald et al. |
| 4,499,994 A | 2/1985 | Rentch |
| 4,502,598 A | 3/1985 | Wartenbergh |
| 4,516,678 A | 5/1985 | Fotiadis et al. |
| 4,523,356 A | 6/1985 | Charlot, Jr. |
| 4,635,797 A | 1/1987 | Bankier |
| 4,658,955 A | 4/1987 | Eichner |
| 4,670,950 A | 6/1987 | Wisecup et al. |
| 4,682,690 A | 7/1987 | Tiffany |

(Continued)

FOREIGN PATENT DOCUMENTS

DE       29722209 U1   2/1998

(Continued)

*Primary Examiner*—Jacob K Ackun, Jr.
(74) *Attorney, Agent, or Firm*—Zollinger & Burleson Ltd.

(57) ABSTRACT

A locking device and method for a storage container provide benefit denial. The locking device includes a base part and a cover part configured to lock to the base part. The cover part is configured to prevent a disk from being removed from a disk-retaining hub when the cover part is locked to the base part, and the base part is configured for easy and secure connection to the storage container. The base part includes a stop for engaging the exterior of the case when inserted into a receptacle in the bottom wall of the container, which precludes the base part from being pulled through the bottom wall of the storage container When the cover part is locked to the base part, the base part cannot be separated from the storage container without causing damage to the media disk.

15 Claims, 8 Drawing Sheets

U.S. PATENT DOCUMENTS

| | | | |
|---|---|---|---|
| 4,700,839 | A | 10/1987 | Fujii |
| 4,709,813 | A | 12/1987 | Wildt |
| 4,750,618 | A | 6/1988 | Schubert |
| 4,805,769 | A | 2/1989 | Soltis et al. |
| 4,819,797 | A | 4/1989 | Holmgren |
| 4,834,238 | A | 5/1989 | Hehn et al. |
| 4,874,085 | A | 10/1989 | Grobecker et al. |
| 5,085,318 | A | 2/1992 | Leverick |
| 5,320,219 | A | 6/1994 | Ward |
| 5,363,962 | A | 11/1994 | Toral et al. |
| 5,385,231 | A | 1/1995 | Nowotny |
| 5,400,902 | A | 3/1995 | Kaminski |
| 5,426,419 | A | 6/1995 | Nguyen et al. |
| 5,462,159 | A | 10/1995 | Roth et al. |
| 5,517,178 | A | 5/1996 | Rodrigues |
| 5,528,914 | A | 6/1996 | Nguyen et al. |
| 5,535,606 | A | 7/1996 | Nguyen et al. |
| 5,551,559 | A | 9/1996 | Roth et al. |
| 5,601,188 | A | 2/1997 | Dressen et al. |
| 5,782,350 | A | 7/1998 | Weisburn et al. |
| 5,829,582 | A | 11/1998 | Ippolito et al. |
| 5,894,924 | A | 4/1999 | Koch |
| 5,896,985 | A | 4/1999 | Nakasuji |
| 5,904,246 | A | 5/1999 | Weisburn et al. |
| 5,934,114 | A | 8/1999 | Weisburn et al. |
| 6,016,909 | A | 1/2000 | Chang |
| 6,065,593 | A | 5/2000 | Howerton et al. |
| 6,092,401 | A | 7/2000 | Sankey et al. |
| 6,102,200 | A | 8/2000 | Dressen et al. |
| D430,424 | S | 9/2000 | Belden et al. |
| 6,112,894 | A | 9/2000 | Kikuchi et al. |
| D436,435 | S | 1/2001 | Weinstock |
| 6,283,280 | B1 | 9/2001 | Wong et al. |
| 6,373,390 | B1 | 4/2002 | Hogan et al. |
| 6,382,413 | B1 | 5/2002 | Nakamura et al. |
| 6,435,343 | B1 | 8/2002 | Wu et al. |
| 6,474,117 | B2 | 11/2002 | Okuno |
| 6,516,945 | B2 | 2/2003 | Myszka et al. |
| 6,675,961 | B2 | 1/2004 | Myszka et al. |
| 6,675,962 | B2 | 1/2004 | Myszka et al. |
| 6,675,963 | B2 | 1/2004 | Myszka et al. |
| 6,896,133 | B2 | 5/2005 | Spagna |
| 7,073,236 | B2 | 7/2006 | Xue |
| D546,660 | S | 7/2007 | Burdett et al. |
| 2002/0096442 | A1 | 7/2002 | Myszka et al. |
| 2002/0189961 | A1 | 12/2002 | Myszka et al. |
| 2003/0080007 | A1 | 5/2003 | Lau |
| 2004/0020802 | A1 | 2/2004 | Chang |
| 2005/0205442 | A1 | 9/2005 | Spagna |

FOREIGN PATENT DOCUMENTS

| | | |
|---|---|---|
| FR | 6608564 | 6/1988 |
| FR | 2785439 | 5/2000 |
| NL | 1003965 | 3/1996 |
| WO | WO 2004/074611 A1 | 9/2004 |
| WO | WO 2004/093082 A1 | 10/2004 |

STORAGE CONTAINER WITH LOCKING DEVICE FOR RECORDED MEDIA

RELATED APPLICATION DATA

This application claims the benefit of U.S. Provisional Application No. 60/528,355, filed Dec. 10, 2003, which is incorporated herein by reference in its entirety.

BACKGROUND OF THE INVENTION

1. Technical Field

The present invention generally relates to media storage containers and, more particularly, to a media storage container including a locking device that holds an item of recorded media to the container until the locking device is unlocked. Specifically, the present invention relates to a media storage container having a hub that receives a disk of recorded media, such as a compact disk (CD) or digital video disk (DVD), and a locking device that cooperates with the hub to prevent the disk from being removed from the hub. The storage container and locking device are particularly useful for holding an item of recorded media that is repeatedly rented.

2. Background Information

Renting items of recorded media including movies and video games has become immensely popular in recent times given the ever increasing number of items available for home viewing and use as well as the decrease in price of the machines that play the media. Typical rental stores display the items available for rental in storage containers that protect the items from dust, ultraviolet light, and damage from impact if accidentally dropped. Stores protect themselves against theft by placing one or more EAS tags on the container for the item of recorded media. An EAS tag is adapted to activate an alarm when passed through a sensing device that may be disposed around the exit of the store.

The EAS tag usually are not affixed to the item of recorded media. Knowing this, shoplifters have been known to open the storage containers in order to remove the item of recorded media from the storage container. Special storage containers have been developed that can be locked to prevent opening of the storage containers except by store clerks using special keys. Notwithstanding, determined shoplifters have found ways to open the locked storage containers, that often involves destruction of the storage container and/or container lock. To prevent this, the storage containers would need to be made of stronger materials, but this usually is cost prohibitive.

As an alternative, a locking device can be employed to hold the item of recorded media to the storage container in such a manner that when the locking device is in place, the item can only be removed by destroying the item. This is called "benefit denial" and this can function as an effective deterrent. U.S. Pat. No. 6,516,945 discloses a storage container for a recorded media disk wherein the disk is held on a hub within the container. A device cooperates with the hub to prevent the disk from being removed from the hub until an end user of the disk destroys the device and discards it when first removing the disk from the hub. This storage container and locking device are particularly well-suited for the retail sale of recorded media disks. However, this manner of locking the disk against removal is not well suited to the rental of recorded media disks. A store clerks or the end user would have to destroy the locking device each time a disk is rented. Then, when the disk is returned, a new locking device would have to be used to lock the disk to the storage container.

Another known storage container secures the disk by locking it through the center hole of the disk. A locking tack has a head and a projecting pin that extends through a hole in the lid of the container. The locking tack is locked by a ball clutch device included in a hub that is attached to bottom wall of the base. Such arrangement prevents opening of the storage container since the locking tack extends through the lid. While this may be advantageous, the enlarged head of the locking tack covers a portion of the outer surface of the lid which oftentimes is provided with graphics, and thus a portion of the graphics will be obscured by the head of the locking tack. Generally, such arrangement is not very attractive or aesthetically pleasing.

SUMMARY OF THE INVENTION

The present invention provides a locking device and method for a storage container that overcomes one or more drawbacks associated with prior art locking devices and particularly those intended to provide "benefit denial". The locking device generally comprises a base part and a cover part configured to lock to the base part. The cover part is configured to prevent a disk from being removed from a disk-retaining hub when the cover part is locked to the base part, and the base part is configured for easy and secure connection to the storage container. In one embodiment, the base part has a quick connect feature for quick connection to a bottom wall of a storage container base when inserted into a receptacle in the bottom wall. The receptacle is preferably formed interiorly of the disk-retaining hub and opens to the exterior of the case. The base part preferably has a stop, such as a flange, for engaging the exterior of the case when inserted into the receptacle, thereby precluding the base part from being pulled through the bottom wall of the storage container if someone were to apply substantial pulling force to the cover part. That is, in a preferred embodiment, when the cover part is locked to the base part, the base part cannot be separated from the storage container without causing damage to the media disk.

Thus, a locking device and method according to one aspect of the invention are characterized by a base part, and a cover part configured to lock to the base part. The cover part is configured to prevent a disk from being removed from a disk-retaining hub in a storage container when the cover part is locked to the base part. The base part has a quick connect feature for quick connection to a bottom wall of a storage container base when inserted into a receptacle in the bottom wall.

According to another aspect of the invention, there is provided a locking device for a disk-retaining hub configured to retain a disk-shaped item of recorded media. The locking device comprises a female part, and a male part configured to lock to the female part. The male part has a head and a post extending from the head, and the head is configured to prevent a disk from being removed from the disk-retaining hub when the head is locked to the base. The female part has a quick connect feature for quick connection to a bottom wall of a storage container base when inserted into a receptacle in the bottom wall from outside the container base.

According to another aspect of the invention, there is provided a storage container with a locking device for a disk, wherein the storage container includes a base, a lid cooperating with the base to form a chamber for the disk when the lid is closed on the base, and a hub on the base configured to hold the disk on the hub in a manner that allows removal of the disk from the hub and replacement of the disk on the hub. The locking device include a female part, and a male part configured to lock to the female part, the male part having a head and a post extending from the head. The head is configured to prevent a disk from being removed from the disk-retaining hub when the head is locked to the base, and the head is dimensioned to fit within the chamber when the lid is closed on the base. In a preferred embodiment, the female part is quick-connected in a receptacle in the base.

According to a further aspect of the invention, there is provided a method for renting a recorded media disk. The method comprises the steps of selecting, at a retail establishment, a storage container having a disk-retaining hub; selecting a locking device including a female part, and a male part configured to lock to the female part, the male part having a head and a post extending from the head; inserting the female part of the locking device into a receptacle in a base of the storage container; placing the recorded media disk on the hub; and inserting the male part into the female part with the recorded media disk being trapped between the head of the male part and the base of the storage container. The method additionally can include the steps of using a key to unlock the male part from the female part to enable removal of the recorded media disk from the storage container.

According to another aspect of the invention, there is provided a method of locking a recorded media disk to a hub within a storage container, the storage container including a base, a lid cooperating with the base to form a chamber for the disk when the lid is closed on the base. The method comprises the steps of quick connecting a base part to the hub from outside the container base, the base part having a first locking component, and locking a cover part onto the base part from inside the container base, the cover part having a second locking component cooperative with the first locking component of the base.

Further features of the present invention will become apparent to those skilled in the art upon reviewing the following specification and attached drawings.

DETAILED DESCRIPTION OF THE DRAWINGS

A storage container for a disk-shaped item of recorded media (also herein referred to as a recorded media disk or simply a disk) is indicated generally by the numeral 10 in the accompanying drawings. The container 10 includes a base 12 and a lid 14 that is movable between open and closed positions. In the closed position, lid 14 and base 12 cooperate to form a storage chamber 15 for the recorded media disk 16.

In the illustrated embodiment, the base 12 has bottom wall 20 that has a raised central portion 22 forming a center support for the central region of the disk. A hub 24 projects upwardly from the center support 22 and the disk 16 has a center hole that fits over the hub 24 when the disk is placed in the storage container 10. The hub 24 can have any suitable configuration for preventing or at least limiting any shifting movement of the disk perpendicular to the axis of the hub.

Figure 1:
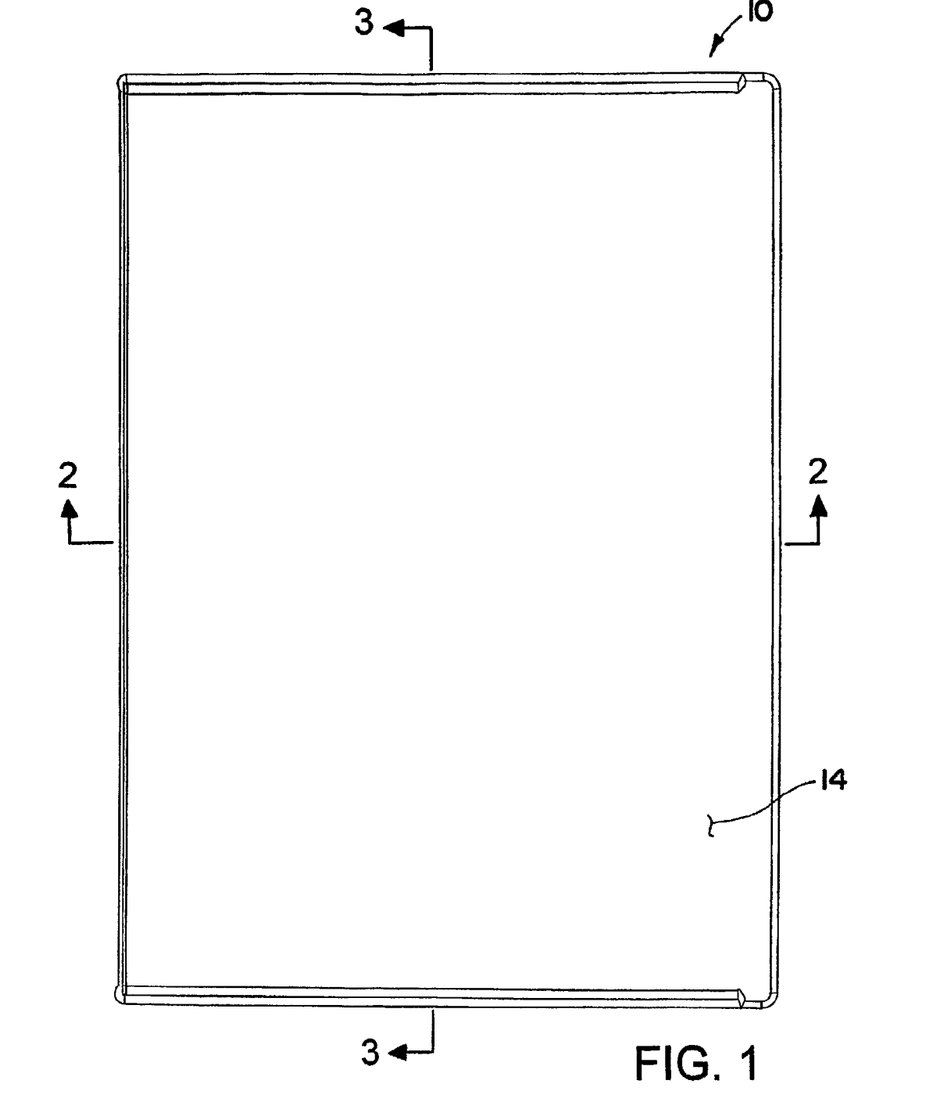
FIG. 1 is a top plan view of a storage container shown in its closed condition.
Figure 2:
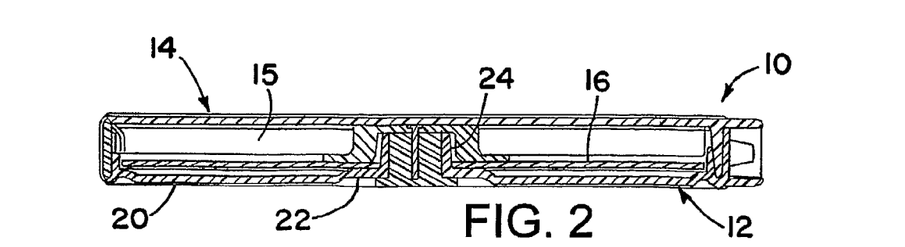
FIG. 2 is a sectional view taken along line 2-2 of FIG. 1.
Figure 3:
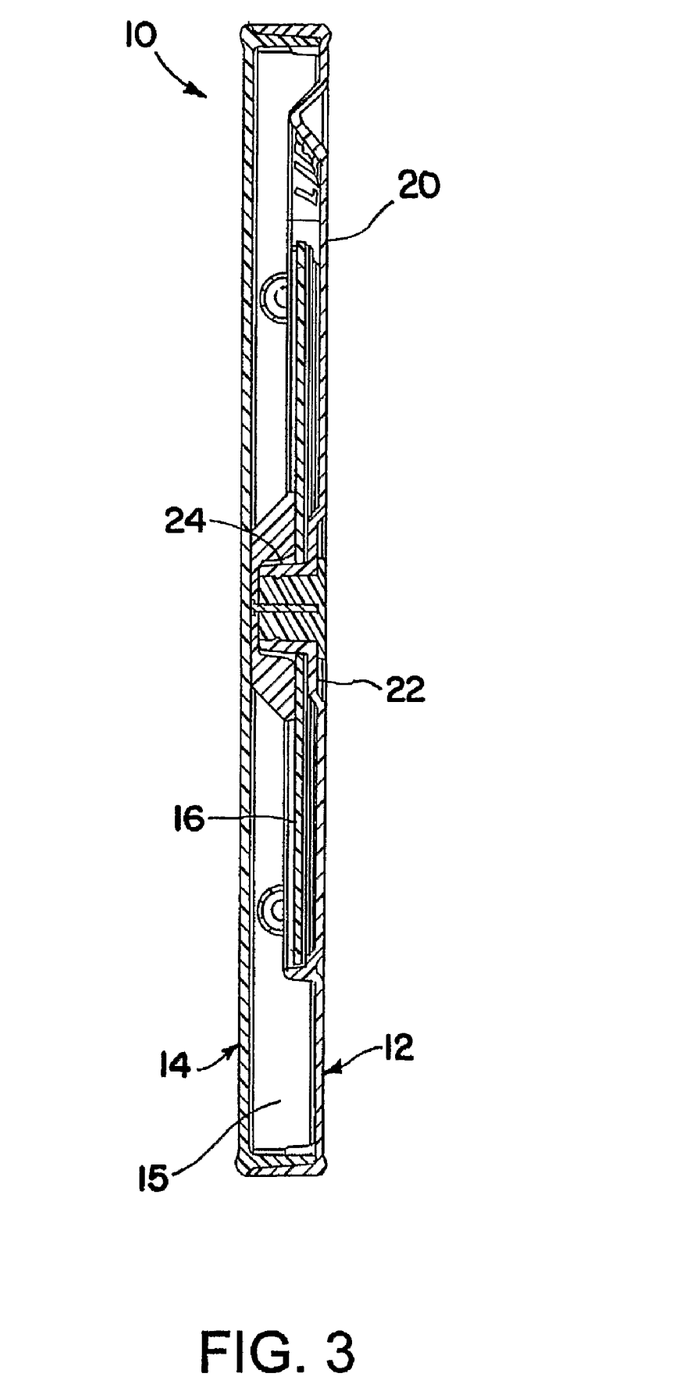
FIG. 3 is a sectional view taken along line 3-3 of FIG. 1.
Figure 4:
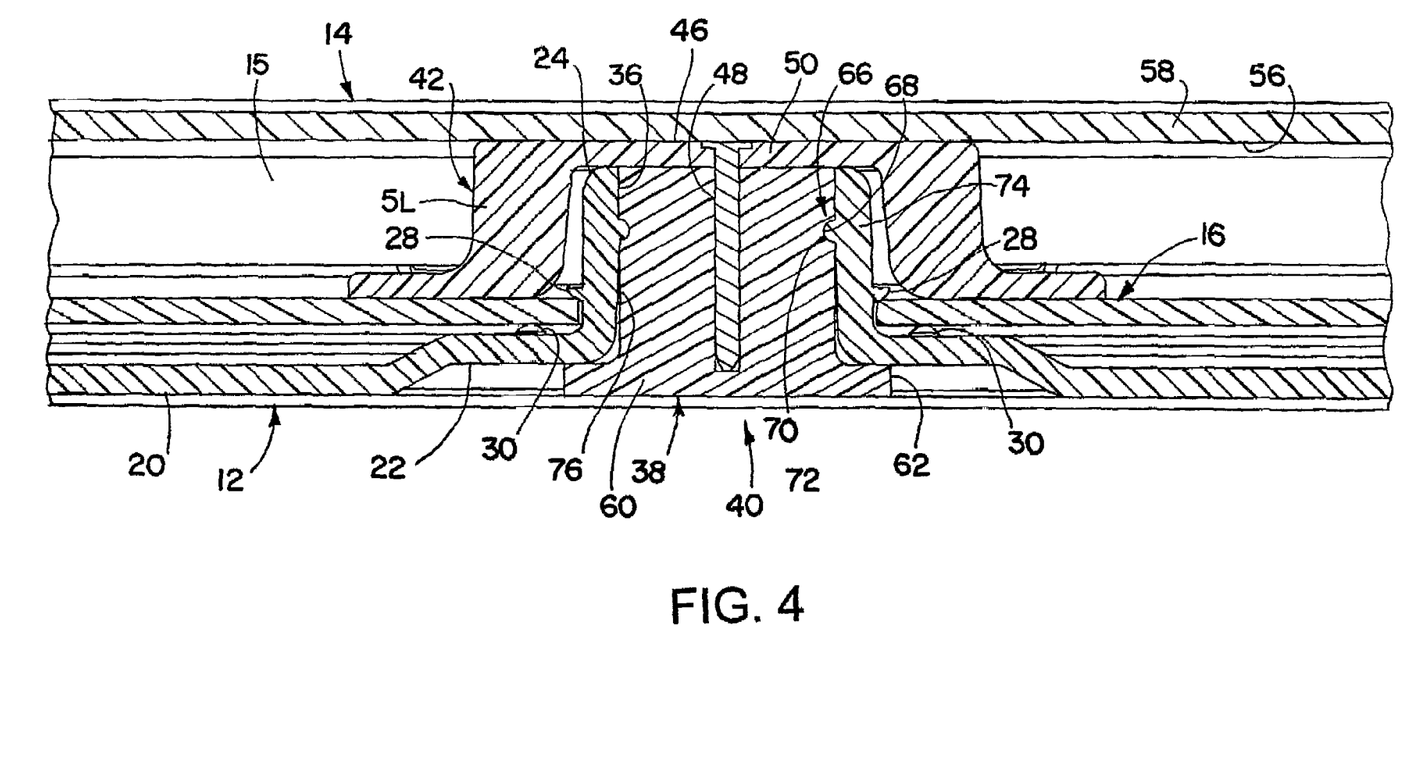
FIG. 4 is an enlarged portion of the sectional view of FIG. 3, showing details of the hub portion of the storage container showing a recorded media disk held to the container by a locking device according to the invention.

In a well known manner and as shown in FIG. 4, the hub 24 is provided with one or more radially outwardly extending protrusions 28 for axially holding the disk 16 on the hub. The protrusions 28 can be resiliently radially inwardly deflected to allow removal of the disk from the hub or placement of the disk on the hub. The protrusions can be diametrically disposed in relation to a substantially cylindrical sidewall of the hub. The number of protrusions can be varied as desired, and the protrusions can be disposed at the end of resilient fingers that are cantilevered from the hub or support surface 24. If desired, the protrusions can be axially spaced from the center support 22 a distance that can accommodate more than one disk, such as two, three or more disks.

The protrusions 28 hold the central region of the disk 16 against the center support 22 or, more generally, function as an axial stop for retaining one or more disks on the hub between the protrusions and the center support. The top surface of the center support preferably has a plurality of raised nubs 30 that minimize friction between disk 16 and the center support.

As shown in FIG. 4, the hub 24 has an interior receptacle 36 for receiving a female part 38 of a locking device 40 according to the invention. The locking device 40 also comprises a male part 42 that can be locked to the female part until released by a clerk using an unlocking device. In the illustrated embodiment, the male locking part 42 is a locking tack including a head 46 in the form of a cap and a post 48 extending from a central portion 50 of the cap. The cap also has a skirt portion 52 depending from the central portion 50 for engaging a top surface of the disk thereby to hold the disk against the center support 22 until the locking tack is released from the female part 38 in the below discussed manner. As shown, the skirt 52 has generally a truncated conical shape having a planar bottom surface for providing a wide area of contact with the disk 16. As will be appreciated, the cap is sized to fit within the space between the disk 16 and inner surface 56 of the lid, as illustrated in FIG. 4. Accordingly, the male locking part, as is preferred, does not extend through the upper wall 58 of the lid, and thus any graphics on the outer surface of the lid are not obscured by the head of the locking tack 42.

If desired, the upper wall 58 can be provided with an inwardly projecting retention mechanism. When the case is closed, the retention mechanism will not interfere with the male part of the locking device if installed. If the male part of the locking device is not installed, the retention mechanism will function to prevent a disk from moving axially off the hub should the disk somehow pass over the protrusions. This provides extra protection from a disk becoming separated from the hub because of any rough handling of the case. An exemplary retention mechanism is a cylindrical ring projecting inwardly from the upper wall of the lid. The ring has a diameter such that it will engage the top side of a disk in the central hub area inwardly of the primary data storage area of the media disk. The inner diameter of the ring will be sufficiently great to clear at least the upper portion of the head of the mail part, and the ring will extend axially to a point located between the top end of the hub and the top surface of a disk stored on the hub. While the disk may be able to shift axially on the hub, it will be prevented from coming off the hub by the retention ring when the case is closed.

The female part 38 of the locking device 40 can be any suitable mechanism configured to receive and hold, when locked, the locking pin 48 that can be in the form of an elongate thin pin as illustrated, or any other cooperating configuration. Generally, the female part 38 includes a locking mechanism housing 60 that has at its axially outer end a stop 62 for engaging against the underside of the bottom wall 20 of the base 12. The female part also is provided with a quick connect device 66 which in the illustrated embodiment includes a retention device 68 cooperating with a retention device 70 on the hub 24 for holding the female part to the base 12. In the illustrated embodiment, the housing 60 has a cylindrical outer surface 72 sized to closely fit in a cylindrical receptacle 36 formed by a tubular sidewall 74 of the hub. The radially inner surface 76 of the hub sidewall and the radially outer surface of the housing are respectively provided with a radial protrusion 70 and recess 68 that cooperate to hold the housing in the hub. If desired, the protrusion can be provided on the hub and the recess on the housing. Preferably, the housing and hub, preferably made of plastic, have sufficient resiliency to allow the housing to be inserted into the hub until the protrusion snaps into the recess. In a preferred embodiment, the recess is an annular groove and the protrusion is an annular bead that fits in the groove to hold the housing in the hub. Although not normally needed, provision can be made to allow the housing to be removed by pushing the housing 60 out of the hub.

As is preferred, the stop 62 will be held against the underside of the bottom wall 20 of the base 12. Preferably, the stop is formed by an annular flange projecting radially outwardly from the bottom of the locking mechanism housing 60. The flange preferably has an axial thickness equal or less than the depth of a recess or well formed in the bottom wall of the housing, so that it does not project below the bottom surface of the surrounding portion of the bottom wall. The recess preferably is formed by reason of the raised central portion 22 of the bottom wall which is upwardly offset from the balance of the bottom wall surrounding the raised central portion, thereby forming the recess or well for the flange.

As above mentioned, the female part 38 of the locking device 40 can be any suitable mechanism configured to receive and hold, when locked, the post 48. A preferred mechanism is a ball clutch mechanism 90, such as that shown in FIGS. 5-8. The illustrated ball clutch mechanism is of a conventional construction, including a tapered retaining ring 92, a plunger 94 including plural apertures 96 for receiving respective detents (such as ball bearings 98), and a return spring 100, all assembled and retained in the housing. The spring forces the plunger towards the tapered retaining ring which has an inner converging surface that cams the ball bearings radially inwardly into binding engagement with the post of the locking tack that extends through coaxial center holes in the housing, retaining ring and plunger. If desired, the post can be provided with an annular groove for receiving the balls to provide an axial interference blocking axial withdrawal of the post from the ball clutch mechanism, or reliance could be had solely on friction or some other grip enhancing surface texturing of the post.

With the foregoing ball clutch mechanism, the locking tack can be released from the ball clutch mechanism by positioning a properly oriented magnet 106 beneath the bottom of the female part. The plunger, which is made of a ferromagnetic material, will be pulled by magnetic force towards the magnet and away from the retaining ring, allowing the ball bearings to move outwardly and free the post of the locking tack for removal. When the ball clutch mechanism is moved away from the magnet, the spring will move the plunger towards the retaining ring, causing the ball bearings to be forced radially inwardly. The other parts of the ball clutch mechanism preferably are made of a non-ferromagnetic material so as not to interfere with the magnetic force acting on the plunger.

Upon reuse, such as after a rental disk has been returned to the rental store, the locking tack can be reinserted into the ball clutch mechanism to lock the locking tack in place. As the post of the locking tack is inserted into the ball clutch mechanism, the leading end of the post will engage the balls and push the them axially and in turn the plunger against the biasing force of the spring. After the plunger has moved sufficiently to allow the ball bearings to move radially outwardly to a point allowing the post to pass therebetween, the plunger will once again be forced by the spring toward the retaining ring thereby to lock the post against withdrawal from the ball clutch mechanism.

Although a magnet is used as a key in the illustrated exemplary embodiment, other types of keys can be used with other types of locking mechanisms.

Figure 5:
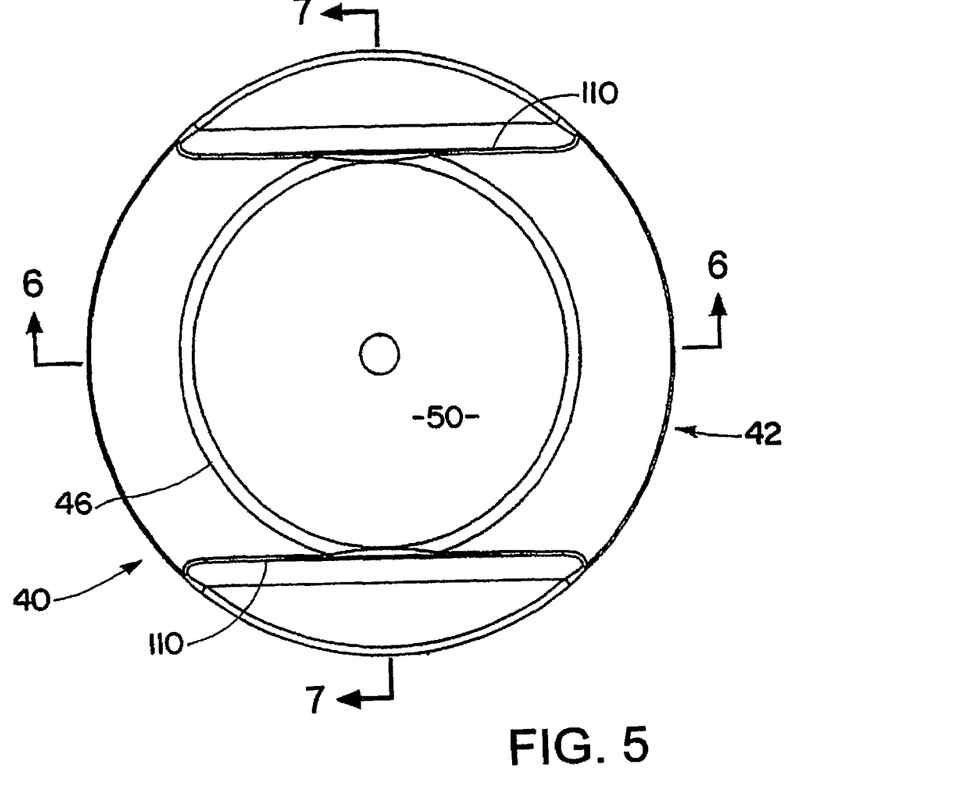
FIG. 5 is a top plan view of the locking device shown separate from storage container.
Figure 6:
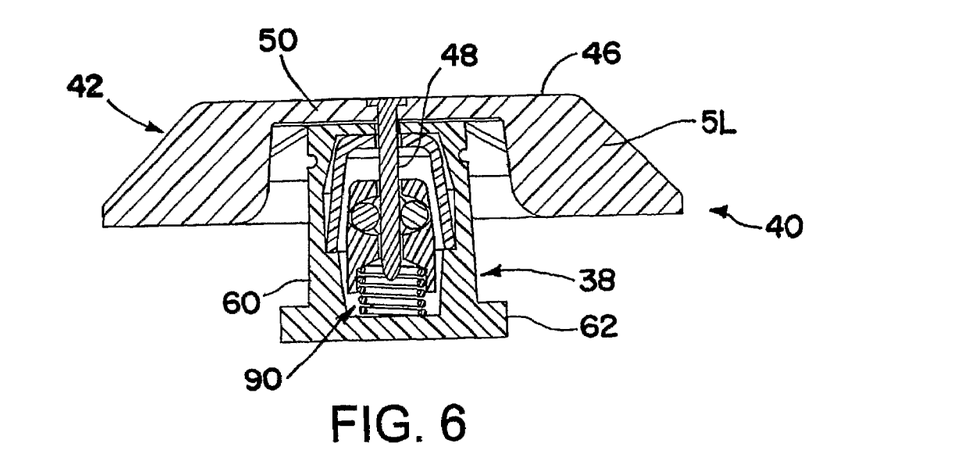
FIG. 6 is a sectional view of the locking device taken along the line 6-6 of FIG. 5.
Figure 7:
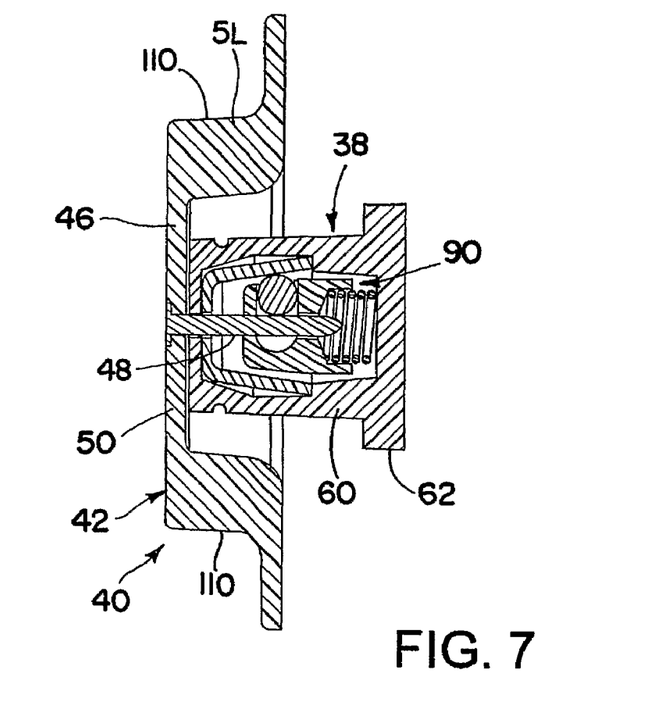
FIG. 7 is a sectional view of the locking device taken along the line 7-7 of FIG. 5.
Figure 8:
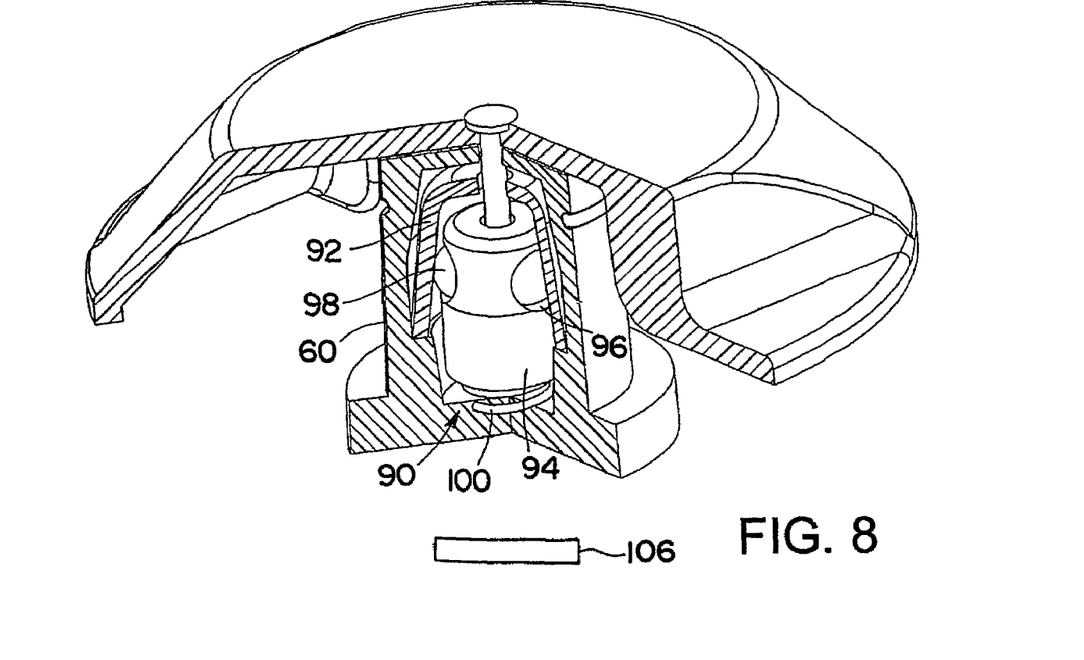
FIG. 8 is an enlarged perspective view of the locking device, shown partly broken away in section.
Figure 9:
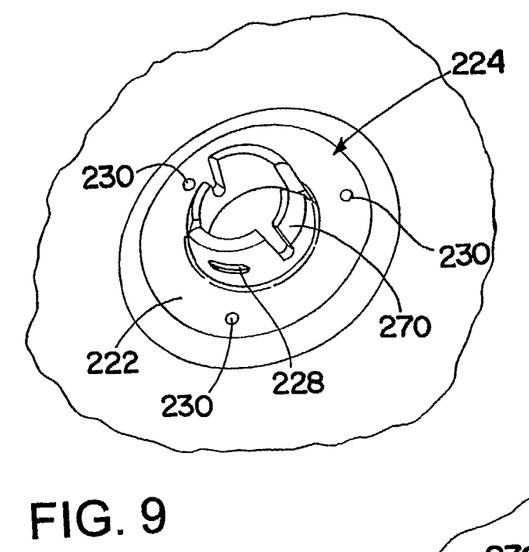
FIGS. 9 and 10 is a perspective views of the hub portion of another storage container according to the invention.
Figure 10:
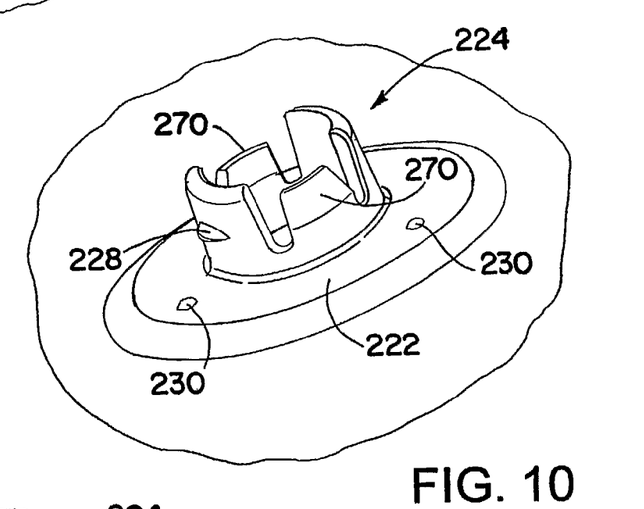
Figure 11:
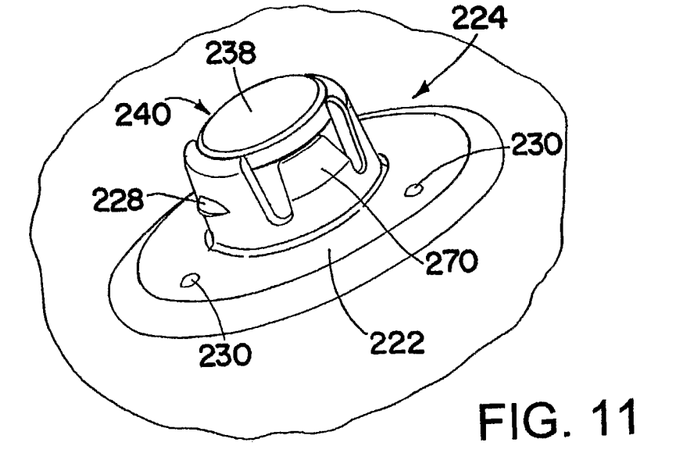
FIG. 11 is a perspective view of the hub portion of the storage container provided in FIG. 9 with the base portion of a locking device engaging the hub portion.
Figure 12:
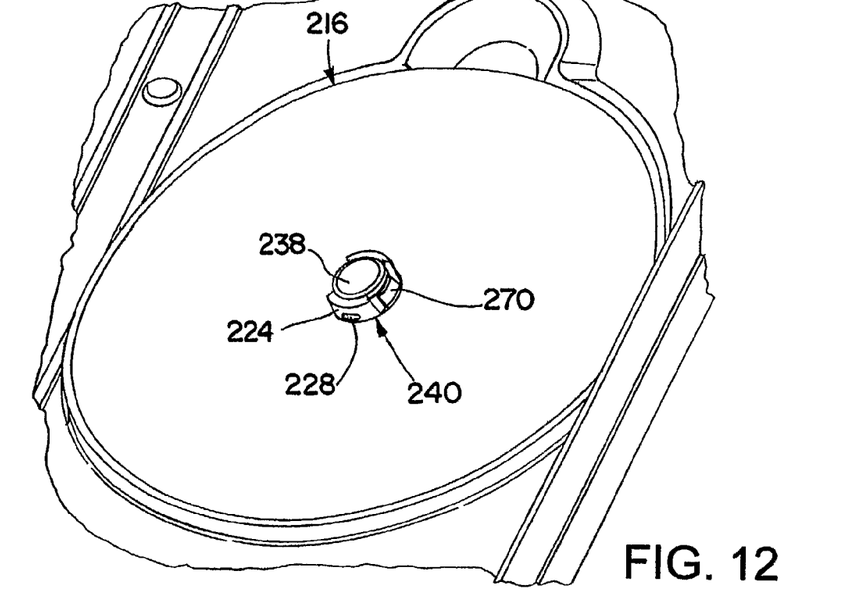
FIG. 12 is a perspective view of the hub portion of the storage container with the base portion of the locking device engaging the hub and a recorded media disk on the hub.
Figure 13:
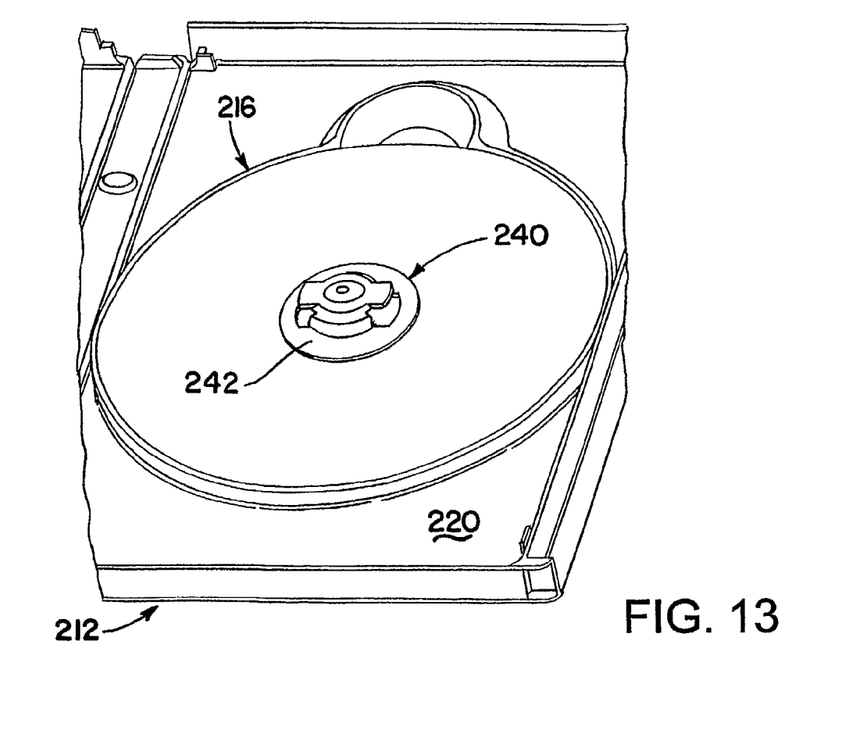
FIG. 13 is a perspective view of the hub portion of the storage container showing a recorded media disk held to the container by a locking device according to the invention.
Figure 14:
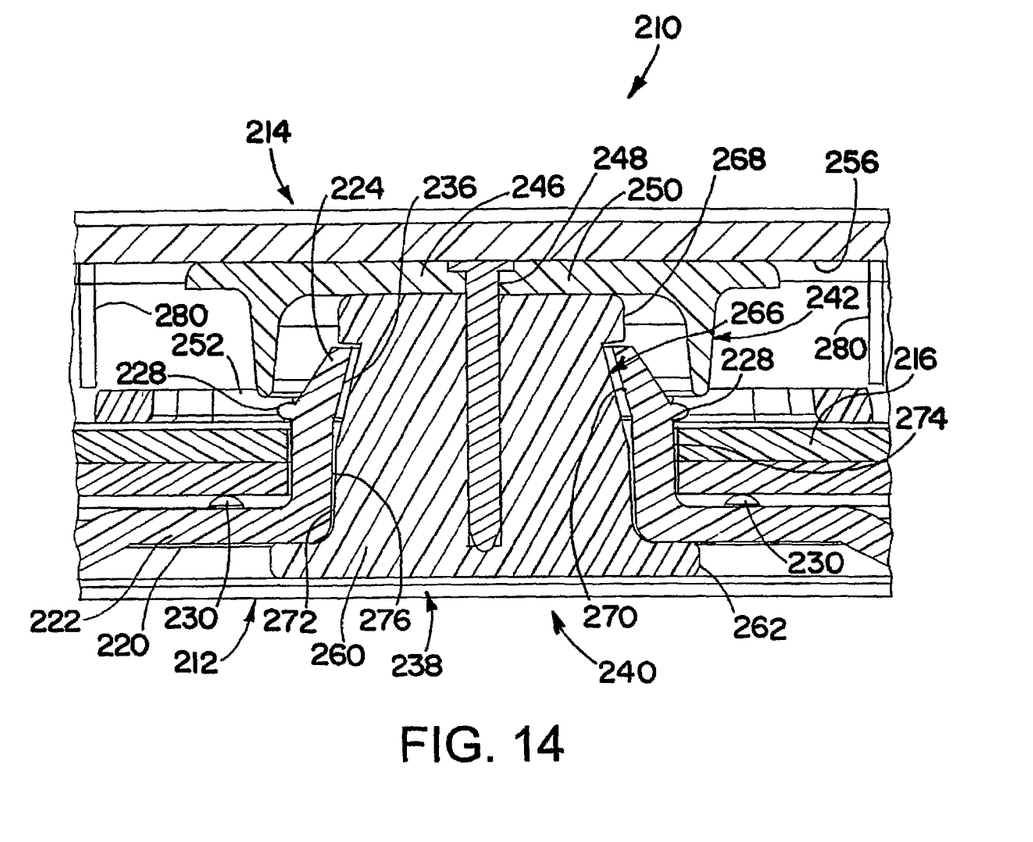
FIG. 14 is an enlarged sectional view showing details of the hub portion of the storage container showing a recorded media disk held to the container by a locking device according to the invention.

As illustrated in FIGS. 5, 6 and 8, the head of the locking tack preferably is provided with diametrically opposed and parallel finger-gripping surfaces 110 to facilitate gripping of the locking tack head during removal of the locking tack from the female part.

The foregoing construction of a storage container and locking device according to the invention provides one or more advantages. As above noted, the outer surface of the lid is not obscured by any part of the locking device, thereby providing a more aesthetically pleasing appearance. If desired, the lid could be provided with a hole for passage of the locking post 48 therethrough, in which case the head of the locking tack can be located outside the lid. In such case, the lid can be provided with a central depression to accommodate the thickness of the head of the locking tack so that it does not protrude beyond the top surface of the upper lid wall surrounding the depression, thereby facilitating stacking of the cases one atop the other even when the locking tacks are installed.

Another advantage is that the storage containers and locking devices can be provided as separate components, and the locking devices used only when needed. Sometimes it may be desirable to use the storage containers without the locking devices. However, when the locking device is needed, the female part can be easily and quickly inserted into the base of the storage container and then used in conjunction with the locking tack. This greatly reduces overall costs since the ball clutch mechanism is a major cost item and need only be installed in the storage container when needed. In fact, the use-on-demand configuration of the female part can be used with the above-discussed prior art locking arrangement where the post extends through a hole in the lid of the storage case, and this application of the female part forms a part of the present invention.

Although the invention has been shown and described with respect to a certain preferred embodiment or embodiments, it is obvious that equivalent alterations and modifications will occur to others skilled in the art upon the reading and understanding of this specification and the annexed drawings. For instance, the above-discussed female and male parts are exemplary of just one of a variety of locking devices that can be employed in accordance with the general principles of the invention. That is, the female part is an example of a base portion of a locking device and the male part is an example of a cover portion or cap which is suitably configured for releasable connection to the base portion. Such connection preferably can be effected quickly and easily, while disconnection requires the use of a key that can be either mechanical and/or magnetic. Consequently, the lock base can in some instances be considered a male member whereas the cap can be considered a female member, or both may have both male and female components for effecting a releasable connection therebetween.

Referring now to FIGS. 9-14, another storage container 210 according to the invention is illustrated. The storage container 210 includes a base 212 and a lid 214 that are relatively movable between open and closed positions. The base 212 has bottom wall 220 that has a raised central portion 222 forming a center support for the central region of the disk. A hub 224 projects upwardly from the center support 222 and a disk 216 has a center hole that fits over the hub 224 when the disk is placed in the storage container 210.

The hub 224 can be provided with one or more radially outwardly extending protrusions 228 for axially holding the disk 216 on the hub. The protrusions 228 can be resiliently radially inwardly deflected to allow removal of the disk from the hub or placement of the disk on the hub. The protrusions can be axially spaced from the center support 222 a distance that can accommodate more than one disk, such as two, three or more disks. The top surface of the center support preferably has a plurality of raised nubs 230 that minimize friction between disk 216 and the center support.

The hub 224 has an interior receptacle 236 for receiving a base part (e.g., female part) 238 of a locking device 240 according to the invention. The locking device 240 also comprises a cover or cap part (male part) 242 that can be locked to the female part until released by a clerk using an unlocking device (key). In the illustrated embodiment, the cover part 242 is a locking tack including a head 246 in the form of a cap and a post 248 extending from a central portion 250 of the cap. The cap also has a skirt portion 252 depending from the central portion 250 for engaging a top surface of the disk thereby to hold the disk against the center support 222 until the locking tack is released from the base part 238. That is, the disk will be trapped between the cap and the disk support 222. As shown, the skirt 252 is has a planar bottom surface for providing a wide area of contact with the disk 216. As will be appreciated, the cap can be sized to fit within the space between the disk 216 and inner surface 256 of the lid. The top wall of the cap can have, as shown, radial projections to facilitate gripping of the cap for removal or installation of the cap.

If desired, the upper wall 258 can be provided with an inwardly projecting retention mechanism 280. When the case is closed, the retention mechanism 280 will not interfere with the male part of the locking device if installed. If the male part of the locking device is not installed, the retention mechanism will function to prevent a disk from moving axially off the hub should the disk somehow pass over the protrusions. This provides extra protection from a disk becoming separated from the hub because of any rough handling of the case. An exemplary retention mechanism is a cylindrical ring projecting inwardly from the upper wall of the lid. The ring has a diameter such that it will engage the top side of a disk in the central hub area inwardly of the primary data storage area of the media disk. The inner diameter of the ring will be sufficiently great to clear at least the upper portion of the head of the mail part, and the ring will extend axially to a point located between the top end of the hub and the top surface of a disk stored on the hub. While the disk may be able to shift axially on the hub, it will be prevented from coming off the hub by the retention ring when the case is closed.

The base part 238 of the locking device 240 can be any suitable mechanism configured to lock with the cover part. As illustrated, the base part is operative to engage the post 248 that can be in the form of an elongate thin pin as illustrated, or any other cooperating configuration. The base part 238 includes a locking mechanism housing 260 that has at its axially outer end a stop 262 for engaging against the underside of the bottom wall 220 of the base 212. The base part also can have a quick connect device 266 which in the illustrated embodiment includes a retention device 268 cooperating with a retention device 270 on the hub 224 for holding the female part to the base 212. In the illustrated embodiment, the housing 260 has a cylindrical outer surface 272 sized to closely fit in a cylindrical or substantially cylindrical receptacle 236 formed by a tubular sidewall 274 of the hub. The radially inner surface 276 of the hub sidewall and the radially outer surface of the housing are respectively provided with a radial protrusion 270 and recess 268 that cooperate to hold the housing in the hub. The housing and hub, preferably made of plastic, have sufficient resiliency to allow the housing to be inserted into the hub until the protrusion snaps into the recess. As illustrated, the recess can be an annular groove and the protrusion can be a pair of diametrically opposed resilient fingers that engage against a shoulder at the top end of the groove. Although not normally needed, provision can be made to allow the housing to be removed by pushing the housing 260 out of the hub.

As is preferred, the stop 262 will be held against the underside of the bottom wall 220 of the base 212. Preferably, the stop is formed by an annular flange projecting radially outwardly from the bottom of the locking mechanism housing 260. The flange preferably has an axial thickness equal or less than the depth of a recess or well formed in the bottom wall of the housing, so that it does not project below the bottom surface of the surrounding portion of the bottom wall. The recess preferably is formed by reason of the raised central portion 222 of the bottom wall which is upwardly offset from the balance of the bottom wall surrounding the raised central portion, thereby forming the recess or well for the flange.

The base part 238 of the locking device 240 can be any suitable mechanism configured to receive and hold, when locked, the cover part. A preferred mechanism is a ball clutch mechanism, like that described above.

In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A storage container with a locking device for a disk, the storage container including:
 a base having a bottom wall;
 a lid cooperating with the base to form a chamber for the disk when the lid is closed on the base;
 a hub on the base configured to hold the disk on the hub in a manner that allows removal of the disk from the hub and replacement of the disk on the hub;
 a locking device including a female part and a male part configured to lock to the female part, the male part having a head and a post extending from the head, the head being configured to prevent a disk from being removed from the disk-retaining hub when the head is locked through the base to the female part, and the head be dimensioned to fit within the chamber when the lid is closed on the base;
 at least a portion of the female part disposed within the hub; the female part and the hub defining a quick connect device that holds the female part to the base; and
 the quick connect device including a retention device on one of the hub and female part and a cooperative retention device on the other of the hub and the female part; the retention device and cooperative retention device being releasably joined together in a resilient snap fit.

2. The container of claim 1, wherein the female part includes a ball and clutch mechanism.

3. The container of claim 2, wherein the ball and clutch mechanism is magnetically operated to release the post.

4. The container of claim 1, wherein the hub includes at least one radial protrusion that axially retain a disk.

5. The container of claim 4, wherein the male part has a portion disposed outwardly of the hub and surrounding a portion of the hub.

6. A storage container with a locking device for a disk, the storage container including:
 a base having a bottom wall having an outer surface; the bottom wall defining a raised central portion that defines a central recess positioned above the outer surface of the bottom wall;
 a lid cooperating with the base to form a chamber for the disk when the lid is closed on the base;
 a hub on the base configured to hold the disk on the hub in a manner that allows removal of the disk from the hub and replacement of the disk on the hub;
 a locking device including a female part and a male part configured to lock to the female part, the male part having a head and a post extending from the head, the head being configured to prevent a disk from being removed from the disk-retaining hub when the head is locked through the base to the female part, and the head be dimensioned to fit within the chamber when the lid is closed on the base;
 at least a portion of the female part disposed inside the hub; and
 the female part having a stop portion disposed in the central recess against the base; the entire female part being disposed above or even with the outer surface of the bottom wall.

7. A storage container with a locking device for a disk, the storage container including:
 a base having a bottom wall;
 a lid cooperating with the base to form a chamber for the disk when the lid is closed on the base;
 a hub on the base configured to hold the disk on the hub in a manner that allows removal of the disk from the hub and replacement of the disk on the hub;
 a locking device including a female part and a male part configured to lock to the female part, the male part having a head and a post extending from the head, the head being configured to prevent a disk from being removed from the disk-retaining hub when the head is locked through the base to the female part, and the head be dimensioned to fit within the chamber when the lid is closed on the base;
 at least a portion of the female part disposed within the hub; the female part and the hub defining a quick connect device that holds the female part to the base;
 the quick connect device including a retention device on one of the hub and female part and a cooperative retention device on the other of the hub and the female part; and
 the retention device including a radial protrusion and the cooperative retention device being in the form of a recess that receives the radial protrusion in a resilient snap fit.

8. The container of claim 7, wherein the cooperative retention device is an annular groove.

9. A storage container with a locking device for a disk, the storage container including:
 a base having a bottom wall;
 a lid cooperating with the base to form a chamber for the disk when the lid is closed on the base;
 a hub on the base configured to hold the disk on the hub in a manner that allows removal of the disk from the hub and replacement of the disk on the hub;
 a locking device including a female part and a male part configured to lock to the female part, the male part having a head and a post extending from the head, the head being configured to prevent a disk from being removed from the disk-retaining hub when the head is locked through the base to the female part, and the head be dimensioned to fit within the chamber when the lid is closed on the base; and
 the hub including a retention device having an upper surface; the female part including a retention device that extends through an opening defined by the hub and is snap fit over the upper surface of the retention device of the hub.

10. The container of claim 9, wherein the male part of the locking device has an inner surface and the female part of the locking device has an upper surface; the upper surface of the female part directly engaging the inner surface of the male part.

11. The container of claim 10, wherein the female part of the locking device has a stop portion for engaging an axially outwardly facing surface of the bottom wall of the container when inserted into the receptacle.

12. The container of claim 9, wherein the hub includes a pair of arms having radially outwardly extending protrusions for axially holding the disk on the hub; the retention device of the hub disposed between the pair of arms.

13. The container of claim 12, wherein each of the arms has an upper portion extending above the retention device of the hub; the female part having an upper portion disposed between the upper portions of the arms.

14. The container of claim 13, wherein the retention device of the hub also has outwardly extending protrusions for axially holding the disk on the hub.

15. The container of claim 9, wherein the female part includes a ball and clutch mechanism.

* * * * *